Figure 1:
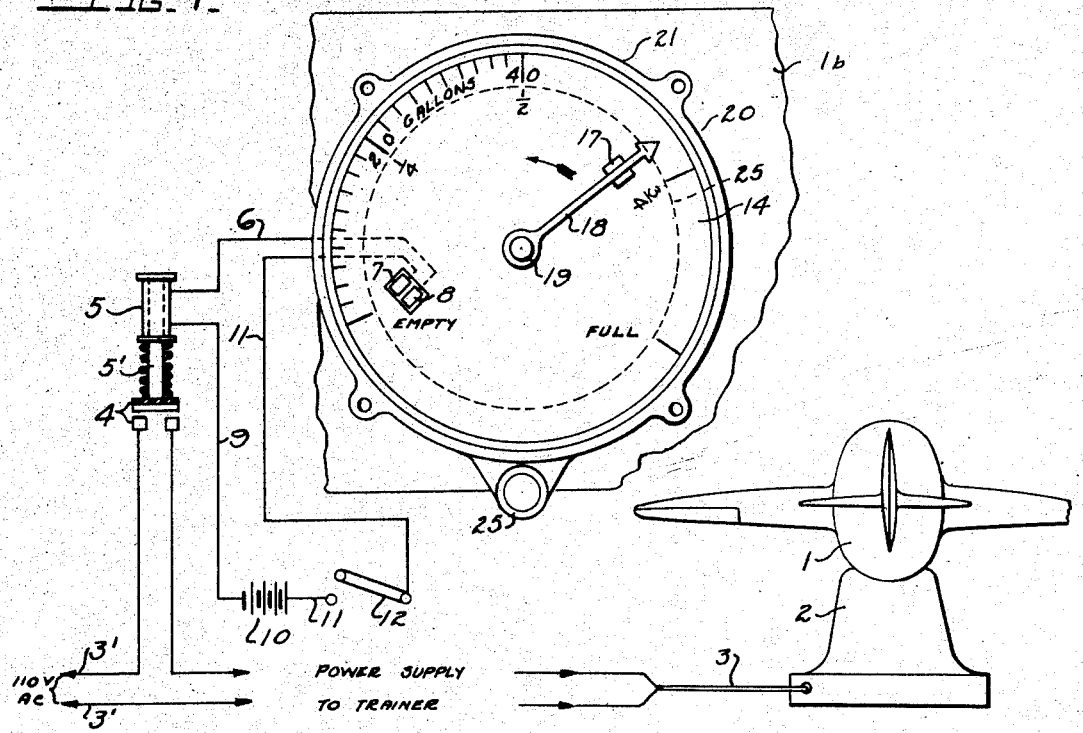

Oct. 22, 1940.    C. W. MULLER    2,218,546
FUEL TANK SELECTOR SIMULATING SINGLE OR MULTIPLE
FUEL TANK SUPPLY FOR GROUND TRAINERS
Filed March 1, 1940    3 Sheets-Sheet 1

INVENTOR
CARL W. MULLER
BY
ATTORNEYS

Oct. 22, 1940.                C. W. MULLER                2,218,546
     FUEL TANK SELECTOR SIMULATING SINGLE OR MULTIPLE
        FUEL TANK SUPPLY FOR GROUND TRAINERS
              Filed March 1, 1940         3 Sheets-Sheet 3

INVENTOR
CARL W. MULLER

Patented Oct. 22, 1940

2,218,546

UNITED STATES PATENT OFFICE 2,218,546

FUEL TANK SELECTOR SIMULATING SINGLE OR MULTIPLE FUEL TANK SUPPLY FOR GROUND TRAINERS

Carl W. Muller, Osborn, Ohio

Application March 1, 1940, Serial No. 321,728

16 Claims. (Cl. 35—12)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to auxiliary apparatus for use in conjunction with aviation ground trainers and more particularly relates to a means to indicate the simulated consumption of fuel during a simulated aircraft flight in an aviation ground trainer and to cut off the electric power supply to the trainer, when the indicator indicates a simulated zero reserve fuel supply, thereby representing failure of an aircraft power plant due to lack of fuel.

Aviation ground trainers for instructing students in the art of instrument flying are well known and comprise, a grounded dummy aircraft, tiltably and rotatably mounted on a base and capable of assuming all of the normal flight attitudes of an aeroplane. The trainer is provided with power means for causing the trainer body to assume a desired attitude and azimuth heading, controlled by the actuation of a dummy aeroplane control system. By actuating the control system, a student can control and correct the position of the trainer in the same manner, as if in actual flight. Trainers of the type described are also provided with various navigating and power plant instruments, which give indications similar to those from corresponding instruments used in actual flight and among the instruments employed is a simulated throttle control and engine tachometer, for simulating the aircraft power plant control and operating condition indicating systems respectively.

For a more complete description of one form of aviation ground trainer of the type known as the "Link" trainer, reference may be had to United States Patents No. 1,825,462 and No. 2,099,857 granted to Edwin A. Link, Jr.

In solving various flight problems in an aviation ground trainer, it is desirable to introduce the factor of fuel supply and consumption, since in actual flight the reserve supply of fuel is an all important problem in a cross country flight and failure of the fuel supply means a forced landing with its attendant dangers. The invention is concerned with a simple means for introducing the simulated fuel supply, as an element in aviation ground trainer problems.

The principal object of the invention, is the provision of a means to indicate the simulated consumption of fuel during a simulated aircraft flight in a ground trainer and adapted to simulate fuel consumption from either a single tank, or multiple tank fuel supply system.

A further object of the invention, is the provision in combination with an aviation ground trainer, of a means to indicate the simulated reserve of fuel at any time during a simulated flight, in said ground trainer and a means responsive to the said indicator, for interrupting the power supply for energizing the trainer, upon a movement of the indicating means to a position indicating a zero reserve fuel supply.

Another object of the invention is the provision in an aviation ground trainer system, of a means to indicate the simulated reserve of fuel at any time during a simulated aircraft flight in said ground trainer and a manual control means for setting the indicator initially, to indicate a desired simulated quantity of fuel.

Figure 2:
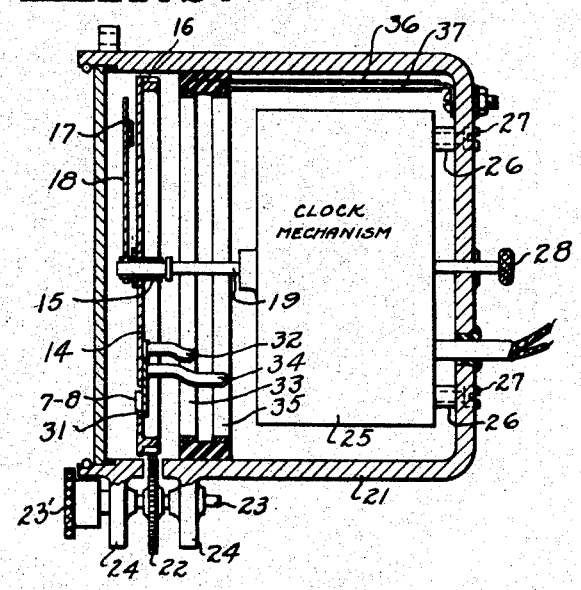
Figure 3:
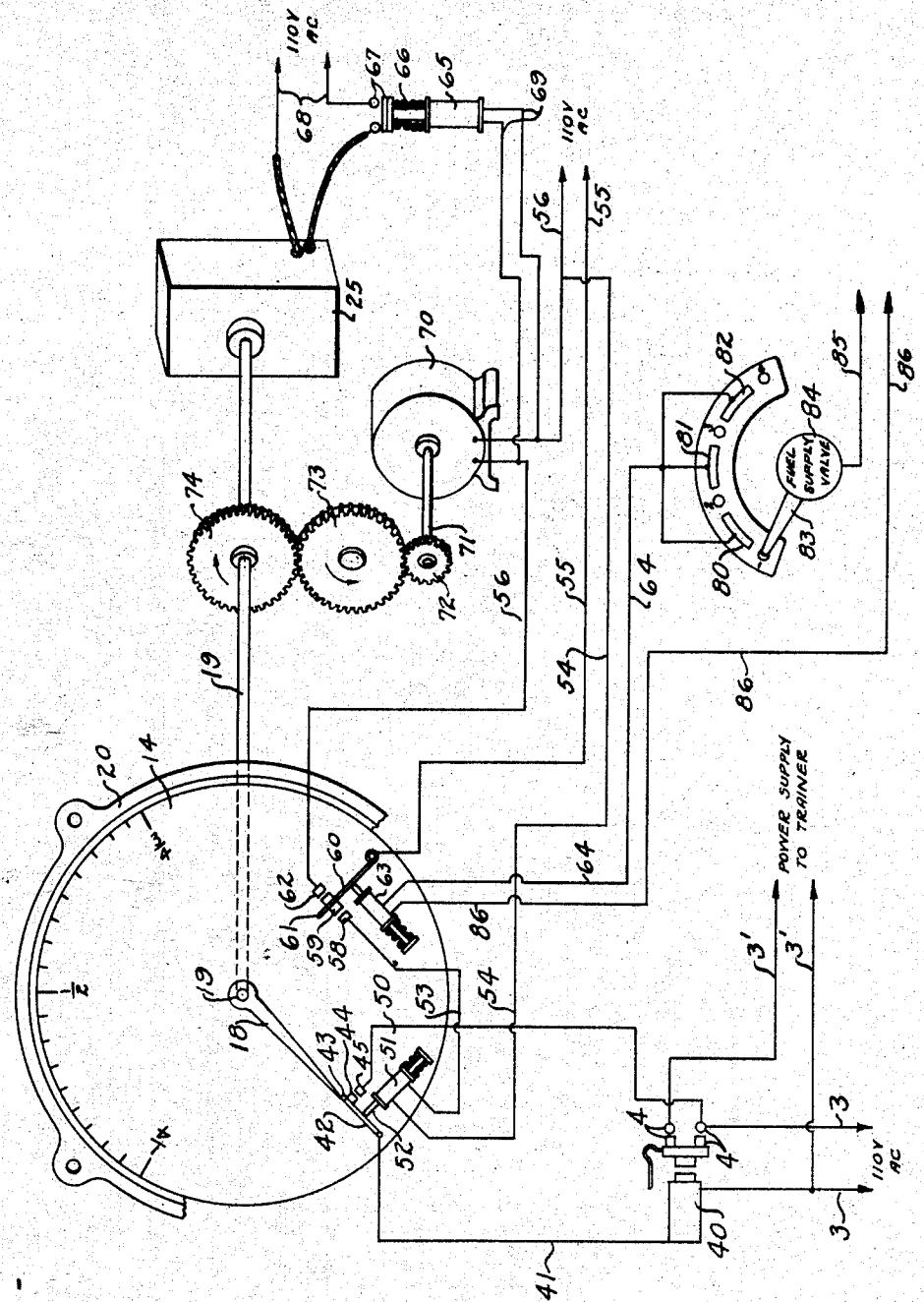
Figure 4:
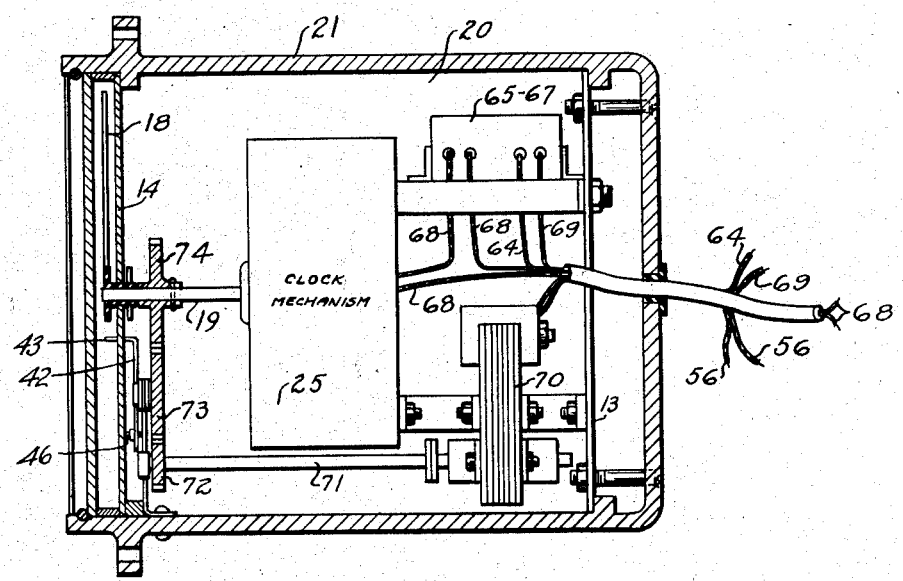
Figure 5:
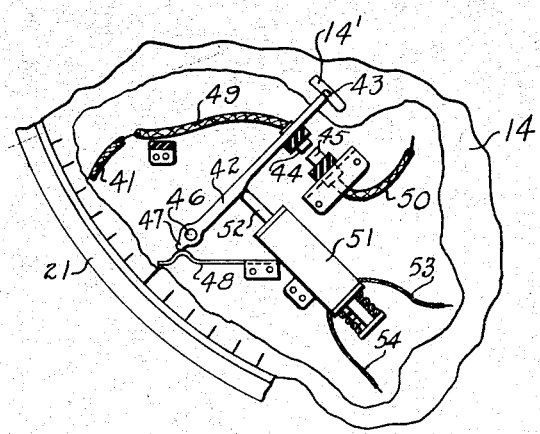

Other objects of the invention will become apparent to those skilled in the art by reference to the specification and the appended drawings in which:

Fig. 1 is a schematic illustration of one form of indicating system used to indicate the simulated fuel reserve in a single tank fuel supply system during a simulated flight in an aviation ground trainer; and Fig. 2 is a view partly in section showing details of the indicator employed in the device of Fig. 1; and Fig. 3 is a schematic illustration of a modified form of the device of Fig. 1, for indicating the simulated fuel reserve in any one of a plurality of simulated fuel supply tanks, including a means for automatically resetting the indicator, as a fuel supply valve simulating means is shifted from one tank connection position to another; and Fig. 4 is a view partly in section illustrating the resetting mechanism and timing device used in the indicator of the device of Fig. 3; and Fig. 5 is an enlarged view of the contact operating mechanism employed in the device of Fig. 3.

Referring to Fig. 1, the numeral I generally indicates an aviation ground trainer, tiltable and rotatable about the base 2 and controlled in the manner above described, to simulate the flight of an aircraft. A cable 3, supplies electric power to energize a motor (not shown) driving a turbo vacuum pump (not shown) which serves as a power actuating means for the trainer, including instruments thereon. The cable 3, contains the power leads 3', controlled by a switch 4, actuated by the spring loaded plunger 5' of a solenoid 5. The solenoid 5, has one coil terminal connected by a conductor 6, to a contact 7. The other terminal of the solenoid coil 5, is connected by means of a lead 9, to one terminal of a battery 10, the other terminal of which is connected by means of a conductor 11 and manually controlled switch 12, to a second contact 8. The contacts 7 and 8 are spaced slightly apart and mounted on suitable insulation on the back of a dial 14, of an indicator 20 and projecting through an opening in the dial face, so as to be contacted by a wiper contact 17, carried by the indicator pointer 18, actuated by the shaft 19, of a clockwork mechanism 25. The indicator 20, is mounted on the instrument board 1b, of the trainer 1.

As seen in Fig. 2, the dial 14, of the indicator 20, is rotatably mounted by means of a sleeve 15, on the shaft 19, of the timing mechanism 25 and the dial 14, carries a gear 16, adjacent its outer periphery, which meshes with a gear 22, mounted on a shaft 23, carried in suitable lugs 24, integrally formed with the indicator casing 21, the gear 22, projecting through a suitable slot 26, in the lower portion of the casing 21, of the indicator 20. The shaft 23 carries an adjustment knob 23', at its outer end, so that rotation of the knob 23', will cause rotation of gears 22 and 16 and dial 14, the dial setting thus being adjustable as desired. The contacts 7 and 8, are mounted on an insulating block 30 suitably secured to the rear face of the dial 14 and the contacts 7 and 8, project through a suitable opening 31, in the dial face and are respectively connected to brushes 32 and 34, carried by the insulating block 30. The brushes 32 and 34, respectively contact the stationary slip rings 33 and 35, mounted on a ring of insulating material, concentric with respect to the axis of the shaft 19. The slip rings 33 and 35, are connected by leads 36 and 37 respectively, to suitable binding posts mounted in the casing 21, the casing being made of any suitable insulating material such as a synthetic resinous material. The binding posts serve to connect the leads 36 and 37, to the conductors 6 and 11 respectively.

The clockwork, or timing mechanism 25, may be of either the mechanical, or electrical type, the latter type being indicated in Fig. 2. The timing mechanism 25, is suitably secured by lugs 26 and screws 27, to the back of the instrument casing 21 and a manual resetting means 28, projects through the rear of the casing 21. The shaft 19, of the timing mechanism 25, carries the pointer 18 at its outer end, to rotate therewith. The pointer 18, is preferably electrically insulated from the shaft 19 and the clearance between the pointer and the face of dial 14, is such that the wiping contact 17, carried by the pointer 18, may engage both contacts 7 and 8.

The dial 14, is graduated over a suitable arc in divisions marked to represent the simulated reserve quantity of fuel remaining in a single fuel tank, the full and empty conditions also being indicated by suitable indicia. If desired a suitable scale graduated in gallons may also be provided, as indicated in Fig. 1, thus permitting the simulated quantity of fuel consumed, to be computed.

Operation

The operation of the device illustrated in Figs. 1 and 2 is as follows:

The instructor, or student sets the dial 14, of the indicator 20, at any desired initial quantity indication relative to the initial position of the pointer 18, which may be fixed by a suitable stop incorporated in the timing mechanism. The timing mechanism may then be started by tripping a suitable release if a mechanical clockwork is used, or by closing a suitable energizing switch if an electrical clock is employed and at the same time, the switch 12 is manually closed by the instructor. The clockwork, or timing device 25, will then rotate the pointer 18, in a counterclockwise direction as seen in Fig. 1, as the trainer flight proceeds and the rate of movement of the pointer is proportional to an assumed specific fuel consumption per unit of time. During the simulated flight in the trainer, the simulated fuel reserve is continuously indicated, so that the student must consider fuel reserve as an additional factor in the problems being solved. When the pointer 18, rotates to the dial indicia point marked, Empty, the wiper contact 17, will engage the contacts 7 and 8 and will complete the circuit from one terminal of battery 10, conductor 9, solenoid 5, conductor 6, lead 36, slip ring 33, brush 32, contacts 7 and 8, wiper contact 17, brush 34, slip ring 35, conductor 37, and conductor 11, through switch 12 to the other terminal of battery 10. The closing of the battery circuit will energize the coil of solenoid 5, pulling the spring loaded solenoid plunger 5', upward, opening switch 4 and interrupting the power supply to the trainer 1, thus simulating the failure of the power plant of an aircraft due to lack of fuel. The interruption of the power supply to the trainer thus simulating failure of the power plant of an aircraft, forces the student to keep the reserve fuel supply always in mind during the simulated trainer flight in the same manner as the pilot of an aeroplane must continually watch the fuel reserve during flight.

In the device of Figs. 1 and 2 it is obvious that other forms of contact mechanism may be employed and various forms of timing devices may be employed such as an adjustable rate mechanism to simulate different specific fuel consumptions.

In Fig. 3, there is illustrated a modified form of the device illustrated in Figs. 1 and 2, enabling the use of the fuel supply indicator with any one of a desired number of simulated fuel supply tanks and corresponding parts are given the same reference numerals as in Figs. 1 and 2. The pointer actuated contact mechanism is illustrated in Fig. 3 as being mounted on the face of the indicator dial for clarity, while such structure is actually placed behind the dial. The dial 14, of the indicator 20', is stationary and non-rotatable, but is graduated with suitable indicia in the same manner as in the device of Fig. 1. The pointer 18, is rotated in a counterclockwise direction from an initial position by the shaft 19, driven by a suitable timing mechanism 25, at a constant rate as in the device of Fig. 1. Power supply leads 3, are connected from a suitable source of alternating current to the trainer supply leads 3' in parallel therewith, through the control switch 4. The control switch 4, is actuated by an alternating current relay 40, one terminal of the relay being connected to one side of the power supply 3 and the other terminal being connected by a conductor 41, to a pivoted arm 42, of a toggle switch having an extension 43, engaged by the pointer 18. The arm 42, carries a contact 44, adapted to engage a contact 45, connected by a conductor 50, to the other side of the power supply 3. The relay 40, when inactive, permits its spring loaded armature to close the switch 4, thus allowing current to flow to the trainer, while if the pointer 18, strikes the extension 43, of the toggle switch arm 42, thus closing contacts 44 and 45, the relay 40 will be energized, to open the switch 4 and interrupt the power supply to the trainer.

A small alternating current solenoid 51, has a spring loaded plunger 52, which may contact the toggle switch arm 43, to open the contacts 44 and 45, when the solenoid 51 is energized. The solenoid 51, has one terminal connected by a conductor 53, to a stationary contact 58, adapted to engage a double contact 59, carried by the toggle switch arm 60, which is similar to the switch arm 42. The toggle switch arm 60, is connected by a lead 55, to a suitable alternating current power supply, the other supply lead 56, thereof, being connected in series with a small alternating current resetting motor 70 and a second stationary contact 62, also adapted to be engaged by the double contact 59, carried by the toggle switch arm 60. The toggle switch arm 60, carries a right angled extension portion 61, which is engaged by the pointer 18, when in the Full position, relative to dial 14 to close the circuit through contacts 58 and 59. The other terminal of the solenoid 51, is connected by a lead 54, to the power supply conductor 56. A small spring loaded solenoid 63, identical to solenoid 51, acts on toggle switch arm 60, so as to break the contact at 58 and 59 and make contact at contacts 59 and 62, whenever the solenoid 63 is energized. One terminal of the coil of solenoid 63, is connected by a conductor 64, to each of three arcuate spaced contact strips 80, 81 and 82, any one of which may be contacted by a switch arm 83, manually controlled by a knob 84, which represents the fuel supply control valve of an aircraft and which is mounted in the cockpit of the trainer 1 of Fig. 1, so as to be readily accessible to the occupant thereof. The switch arm 83, is connected to one lead 85, of a suitable power supply (not shown), the other lead 86 of which, connects to the other terminal of the coil of solenoid 63. It is thus seen that, whenever switch arm 83, contacts one of contacts 80, 81, or 82, the solenoid 63, will actuate the toggle switch arm 60, to a position where contacts 59 and 62 will be closed, connecting motor 70 in series with power leads 55 and 56, to cause the motor 70, to rotate at a fixed speed.

The motor 70, may be a small alternating current motor of the shaded pole type and adapted to rotate in a clockwise direction as indicated by the arrow in Fig. 3. The shaft 71, of the motor 70, has a gear 72, mounted thereon, which meshes with an idler gear 73, which in turn meshes with a gear 74, mounted on the shaft 19, of the timing device 25. The shaft 19, also carries the indicator pointer 18 as previously noted. The timing device 25, when energized, drives the shaft 19 and pointer 18, in a counterclockwise direction, while motor 70, may drive the shaft and pointer in a clockwise direction in a resetting operation. A small solenoid 65, is connected in parallel with the leads of motor 70, to the conductor 56 by a pair of conductors 69. The solenoid 65, has a spring loaded plunger 66, which is adapted to open a switch 67, in the power supply circuit 68, for the timing device 25. It is thus seen, that whenever motor 70, is energized to reset the pointer 18, by driving shaft 19, the solenoid 65, will be energized to open switch 67, to interrupt the power supply to the timing device and thus destroy the torque thereof, permititng motor 70, to freely rotate shaft 19, in the reverse direction, from the direction in which it is driven by the timing device 25. Conversely the motor 70, is never energized when the timing device 25 is operative to drive shaft 19. If desired an additional switch (not shown) may be inserted in the power supply to timing device 25 and adapted to be closed by the instructor when the simulated flight in the trainer 1 is started.

The indicia 1, 2, 3 and 4, adjacent the contact strips 80, 81, etc., represent the position of fuel control valve simulating means 83 and 84, when any one of four simulated fuel tanks are assumed to be in operation and movement of switch arm 83 from one indicating position to another, is similar to the actuation of a fuel control valve in an aeroplane to change from one fuel supply tank to another.

Fig. 4 illustrates a view partly in section showing the arrangement of the timing device 25 and resetting motor 70 of the device of Fig. 3, in the casing 21, of the indicator 20, which is to be mounted on the instrument board of the trainer 1 (Fig. 1), similar parts being given the same reference numerals as in Fig. 3. The solenoids and contact mechanism have not been illustrated in Fig. 4 for the sake of clarity of illustration. The clock or timing mechanism 25 is mounted in the casing 21 so that the axis of shaft 19 is concentric with the dial 14. The shaft 19 is supported in a suitable bearing carried by the fixed dial and has the pointer 18 secured to the outer end thereof to rotate therewith. The shaft 19 has the gear 74 rigidly mounted thereon and meshing with the idler gear 73, which in turn meshes with the gear 72 mounted on the end of the shaft 71 of the resetting motor 70, also mounted in the indicator casing. The solenoid-actuated switch parts 65 to 67 inclusive are suitably enclosed in a casing and mounted within the indicator casing 21. The clock 25, motor 70, and switch assembly 65—67 are mounted on a single plate 13, carried in the instrument casing 21; and the electrical connections to the clock mechanism 25, motor 70, solenoid switch 65—67, and the pointer-actuated switches (not shown) are carried into a single cable passing through the rear of the instrument casing. As is clearly seen in Fig. 4, the bent extension 43 of the switch arm 42 is in the plane of rotation of pointer 18 so as to be engaged thereby in one of its limits of rotation.

Fig. 5 illustrates in an enlarged view, the arrangement of the solenoid 51 and toggle switch 42, of the device of Fig. 3, in the manner actually employed. The various parts such as the solenoid 51, stationary contact 45, etc., are adapted to be secured on the back face of the dial 14, by suitable clips which may be riveted to the dial. The toggle switch arm 42, is pivoted at 46 and adjacent the pivot 46, the hub of the arm is enlarged into a small cam projection 47, which is adapted to contact a light spring 48, which is shaped to form a detent. The force exerted by the spring need only be sufficient to insure proper contact between the contacts 44 and 45, in the position of arm 46, as shown in Fig. 5. The cam 47 and spring 48, form the well known snap action, or toggle switch and any other form of snap action switch might be used. The switch arm 42, has the bent extension portion 43, arranged to project through the slot 14', cut in the dial 14, an amount sufficient to be engaged by the pointer 18, to snap the switch arm 42, to the contact closing position and the solenoid plunger 52, actuates the switch arm 42, to break the electrical contact at contacts 44 and 45, the extension 43 moving to the upper end of the slot 14' and held by the cam and detent spring until the extension 43, is again engaged by the pointer 18. A light flexible braided conductor 49, serves to conduct current from the lead 41, to the contact point 44, which is mounted on the switch arm 42, but insulated therefrom in the manner shown.

The arrangement of the solenoid 63, switch arm 60, extension 61, contact 59 and stationary contacts 58 and 62, is similar to the arrangement illustrated in Fig. 5 and above described, so that no separate illustration of the arrangement of the parts is illustrated in the drawings.

*Operation*

The operation of the device illustrated in Figs. 3 to 5 inclusive, of the drawings is as follows:

With the parts in the position as seen in Fig. 3 and power to the trainer and timing device being cut off by switches (not shown), it may be desired to use the fuel indicator in a flight problem in the aviation ground trainer 1, so the instructor energizes the leads 3, by means of the above mentioned switch (not shown) and then rotates the simulated fuel control to engage for an instant any one of the contacts 80, 81, or 82. A circuit will then be made from power supply leads 85 and 86 to solenoid 63, which will then move arm 60, to close contacts 59 and 62, energizing motor 70, to cause shaft 19 and pointer 18, to be driven clockwise to the Full, position. The pointer 18, will then strike the projection 61, causing switch arm 60, to break the circuit between contacts 59 and 62, thus stopping resetting motor 70 and closing the circuit through contacts 58 and 59, to energize solenoid 51, from power leads 55 and 56. The solenoid 51, then opens the contact at contacts 43 and 44, by acting on switch arm 42 and allows relay 40, to be deenergized closing switch 4 and energizing the trainer 1, through leads 3'. With the switch arm in tank position 1, the simulated trainer flight may be started with all four simulated tanks assumed to be filled with fuel. Upon the instructor's closing a switch (not shown), timing device 25, will be energized and pointer 18 will begin to revolve counterclockwise at a constant rate, simulating the consumption of fuel by an engine supplied from a tank No. 1. If the student fails to note the pointer reaching the Empty position, the pointer 18, will strike the extension 43, of toggle switch arm 42, closing contacts 44 and 45 and energizing relay 40, to open switch 4 and interrupt the trainer power supply at leads 3'. To reestablish the power supply, the student must move the fuel control valve simulating means 83—84, to position No. 2, representing connection of a second full fuel tank to supply an engine. In passing from tank position No. 1 to No. 2, the switch arm 83, will contact the contact strip 80, causing motor 70, to be energized, to reset pointer 18 to the full indicating position and reestablishing a power supply to the trainer in the manner above described. While motor 70 is energized, solenoid 65, deenergizes the timing device 25, until pointer 18, is in the full position, at which position the pointer will strike the projection 61, of toggle switch arm 60 and break the power supply to motor 70 and solenoid 65, at contacts 59 and 62, permitting the spring loaded plunger 67, of the solenoid 65, to reestablish a power supply to the timing device 25. The timing device 25, will then drive pointer 18, through a second cycle, representing consumption of fuel from a simulated tank No. 2. A similar procedure is carried out in resetting the indicator for each additional simulated fuel control valve position of the switch arm 83.

If the pointer 18, is reset by shifting the fuel control valve simulating means 83—84, slightly before the pointer 18, reaches the empty position on dial 14, the operation will be exactly as above described, with the exception, that the toggle switch arm 42, will remain in the position in which contacts 44 and 45, are open, so that the relay 40, will not be energized and the supply of power to the trainer will not be interrupted.

The system illustrated in Figs. 3 to 5 inclusive, can be used to represent a single fuel tank supply system as in the device of Fig. 1 and the system may be operated to faithfully simulate actuation of a multiple fuel tank supply system and reserve supply indication system as employed in an actual aircraft in flight.

While the solenoids 51, 63 and 65, motor 70 and relay 40, have been illustrated in Fig. 3, as being of the alternating current type, these components may be changed to operate from direct current supply sources, without altering the operation of the indicating system in any respect.

While I have illustrated and described two embodiments of the invention, it is evident that other modifications will be apparent to those skilled in the art, falling within the scope of the invention as defined by the appended claims.

I claim:

1. An indicating system for indicating the simulated reserve quantity of fuel in an aviation ground trainer during a simulated flight thereof, comprising, an indicator having a casing, a dial in said casing graduated in terms of fuel quantity, a pointer rotatable between predetermined limits, cooperating with said dial to indicate the instant simulated fuel reserve quantity carried by said trainer and timing means connected to said pointer for rotating said pointer at a preselected velocity proportional to a predetermined simulated rate of fuel consumption of the associated aviation ground trainer and in a direction to indicate the simulated reserve quantity of fuel in said trainer.

2. The structure as claimed in claim 1, including a means for resetting said pointer to a predetermined initial position.

3. The structure as claimed in claim 1, in which said dial is rotatably mounted in said casing and adjustable relative to said pointer so that said indicator indicates a desired simulated initial quantity of fuel when said pointer is in a predetermined initial position.

4. The structure as claimed in claim 1, in which the dial is rotatably mounted in said casing and means operable from the exterior of the casing are provided for manually setting the dial in any desired position relative to a predetermined initial position of said pointer.

5. In combination, an aviation ground trainer for simulating the flight of an aircraft, means for supplying energy to said trainer for operation thereof, a fuel supply indicator mounted in the cockpit of said trainer and including a cooperating dial and pointer, a timing means for causing rotation of said pointer between predetermined limits relative to said dial at a rate proportional to a simulated rate of fuel consumption of said trainer during a simulated flight, said indicator thereby indicating the simulated instant reserve supply of fuel and means responsive to a movement of said pointer to a position indicating an exhausted simulated fuel supply for interrupting the energy supply to said trainer.

6. The structure as claimed in claim 5, in which the means for supplying energy to said trainer is an electrical means including an electrical control switch for interrupting the power supply to said trainer and a connection between said switch and the means responsive to the movement of said pointer to the position indicating simulated fuel exhaustion.

7. The structure as claimed in claim 5, in which the limits of movement of said pointer may be altered through a predetermined range.

8. In an aviation ground training system, an aviation ground trainer for simulating the flight of an aircraft, an electrical power supply circuit for supplying energy to said trainer for operation thereof, a control switch in said circuit for interrupting the power supply to said trainer, electromagnetic means for actuating said control switch, an indicator mounted in said trainer for indicating the simulated instant reserve quantity of fuel during operation of said trainer, said indicator including a pointer and cooperating dial, a timing device for rotating said pointer at a rate proportional to a simulated rate of fuel consumption between indicating limits representing a simulated initial fuel quantity and an exhausted fuel supply, electric contact means for causing actuation of said electromagnetic means and means for actuating said contact means responsive to the movement of said pointer to the position indicating an exhausted simulated fuel supply.

9. The structure as claimed in claim 8, in which said contact means are actuated by said pointer.

10. The structure as claimed in claim 8, including means to reset said pointer to an initial position.

11. The structure as claimed in claim 8, including power means for resetting said pointer to an initial position.

12. The structure as claimed in claim 8, in which said contact means includes a pair of contacts mounted on said dial and insulated therefrom and a third contact carried by said pointer and insulated therefrom, the simultaneous engagement of said contacts energizing said electromagnetic means.

13. A means for simulating a multiple tank fuel supply and indicating system for use in conjunction with aviation ground trainers comprising an indicator, a dial in said indicator, a pointer movable relative to said dial between predetermined limits to indicate the simulated reserve supply of fuel, timing means for rotating said pointer at a velocity proportional to the simulated rate of fuel consumption during the simulated flight of an aviation ground trainer, power means for resetting said pointer to an initial position, a switch means for controlling said power means and having a plurality of positions representing the setting of a fuel control valve to connect a desired one of a plurality of fuel tanks to a fuel delivery conduit and operative when moved from one of said positions to another of said positions to energize said power means to reset said indicator pointer.

14. The structure as claimed in claim 13, in which a means is provided for rendering said timing means inoperative to drive said pointer during the operation of said power resetting means and operative upon the resetting of said pointer to an initial limit position to render said timing means operative to drive said pointer.

15. In combination, an aviation ground trainer for simulating the flight of an aircraft, means for supplying power to said trainer for operation thereof, electromagnetic means for interrupting said power supply, an indicator for indicating the simulated reserve of fuel in any one of a plurality of simulated fuel tanks, said indicator including a dial and a pointer cooperating therewith, timing means for rotating said pointer between predetermined limits at a rate proportional to the simulated rate of fuel consumption of said trainer during a simulated flight to thereby indicate the instant fuel reserve in a selected one of said simulated tanks, power means for resetting said pointer to an initial position, switch control means for said power means and having a plurality of positions representing the setting of a fuel control valve in positions to connect a desired one of said simulated fuel tanks to a fuel delivery conduit and operative when moved from one of said positions to another of said positions to energize said power means to reset said pointer, means operative upon movement of said pointer to one of said limit positions representing the exhaustion of fuel in the selected one of said tanks to energize said electromagnetic means to interrupt said trainer power supply and means operative upon the indicator resetting movement of said switch control means for de-energizing said electromagnetic means to re-establish the supply of power to said trainer.

16. A fuel system simulating means for aviation ground trainers comprising a fuel control valve simulating means having a plurality of positions each of which represents the connection of one of a plurality of fuel supply means to a fuel delivery conduit, a fuel reserve simulating indicating means including a cooperating dial and pointer, timing means for driving said pointer at a rate proportional to a simulated rate of fuel consumption to indicate the instant simulated fuel reserve in a selected one of said simulated fuel supply means and means operative upon movement of said simulated fuel control valve from one of said positions to another of said positions to render said timing means inoperative to drive said pointer and to reset said indicator to an initial position and then re-establish the driving of said pointer by said timing means.

CARL W. MULLER.